(12) United States Patent
Stayton

(10) Patent No.: US 9,857,461 B2
(45) Date of Patent: Jan. 2, 2018

(54) SYSTEMS AND METHODS FOR REMOTE L-BAND SMART ANTENNA DISTANCE MEASURING EQUIPMENT DIVERSITY

(71) Applicant: Aviation Communication & Surveillance Systems LLC, Phoenix, AZ (US)

(72) Inventor: Gregory T. Stayton, Peoria, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 587 days.

(21) Appl. No.: 14/514,145

(22) Filed: Oct. 14, 2014

(65) Prior Publication Data
US 2015/0102953 A1 Apr. 16, 2015

Related U.S. Application Data

(60) Provisional application No. 61/890,416, filed on Oct. 14, 2013.

(51) Int. Cl.
| | | |
|---|---|---|
| *G01S 13/78* | (2006.01) | |
| *H04B 1/3822* | (2015.01) | |
| *H04B 1/40* | (2015.01) | |
| *H01Q 3/24* | (2006.01) | |
| *H01Q 1/28* | (2006.01) | |
| *G01S 7/42* | (2006.01) | |

(Continued)

(52) U.S. Cl.
CPC .............. *G01S 13/785* (2013.01); *G01S 7/42* (2013.01); *H01Q 1/28* (2013.01); *H01Q 3/24* (2013.01); *H04B 1/3822* (2013.01); *H04B 1/40* (2013.01); *H04B 7/0608* (2013.01); *H04B 7/0802* (2013.01)

(58) Field of Classification Search
CPC ....... G01S 13/785; G01S 7/42; H04B 7/0608; H04B 1/3822; H04B 1/40; H04B 7/0802; H01Q 1/28; H01Q 3/24
USPC ................................................. 342/47, 29–40
See application file for complete search history.

(56) References Cited

U.S. PATENT DOCUMENTS

| | | | | |
|---|---|---|---|---|
| 3,825,929 A | * | 7/1974 | Toman | ................. G01S 13/787 |
| | | | | 342/33 |
| RE28,762 E | * | 4/1976 | Toman | ..................... G01S 1/02 |
| | | | | 342/408 |

(Continued)

OTHER PUBLICATIONS

A. P. Shrestha and K. S. Kwak, "Secure opportunistic scheduling with transmit antenna selection," 2013 IEEE 24th Annual International Symposium on Personal, Indoor, and Mobile Radio Communications (PIMRC), London, 2013, pp. 461-465.*

(Continued)

*Primary Examiner* — John B Sotomayor
(74) *Attorney, Agent, or Firm* — Squire Patton Boggs

(57) ABSTRACT

Various avionics systems may benefit from the proper handling of diversity with respect to antennas. For example, systems and methods for remote L-band smart antenna distance measuring equipment may benefit from being prepared to provide diversity against interference, such as a multipath interference. A method can include determining which antenna of a plurality of antennas of an aircraft is preferred for communication with respect to distance measuring equipment. The method can also include selecting the antenna based on the determination.

18 Claims, 3 Drawing Sheets

(51) Int. Cl.
*H04B 7/06* (2006.01)
*H04B 7/08* (2006.01)

(56) References Cited

U.S. PATENT DOCUMENTS

| | | | | |
|---|---|---|---|---|
| 4,185,284 A * | 1/1980 | Vogel | G01S 13/762 | 342/47 |
| 4,651,158 A * | 3/1987 | Nelson | G01S 13/788 | 342/47 |
| 4,680,587 A * | 7/1987 | Chisholm | G01S 13/787 | 342/33 |
| 5,614,913 A * | 3/1997 | Nichols | G01C 15/00 | 342/357.29 |
| 6,222,480 B1 * | 4/2001 | Kuntman | G01S 13/767 | 342/30 |
| 6,304,210 B1 * | 10/2001 | Allison | G01C 15/00 | 342/357.41 |
| 6,313,783 B1 * | 11/2001 | Kuntman | G01S 13/76 | 342/29 |
| 7,436,350 B1 * | 10/2008 | Maloratsky | G01S 7/02 | 342/118 |
| 7,508,343 B1 * | 3/2009 | Maloratsky | H01Q 3/242 | 342/374 |
| 9,116,236 B1 * | 8/2015 | Billsberry | G01S 13/9303 | |
| 2005/0156777 A1 * | 7/2005 | King | G01S 3/023 | 342/29 |
| 2008/0068250 A1 * | 3/2008 | Brandao | G01S 3/46 | 342/30 |
| 2008/0174472 A1 * | 7/2008 | Stone | G08G 5/0021 | 342/30 |
| 2009/0146875 A1 * | 6/2009 | Hovey | G08G 5/04 | 342/357.31 |
| 2011/0298649 A1 * | 12/2011 | Robin | G01S 13/785 | 342/30 |
| 2012/0326923 A1 * | 12/2012 | Oehler | G01S 5/0284 | 342/357.29 |
| 2013/0015998 A1 * | 1/2013 | Jones | G01S 13/9303 | 342/30 |
| 2015/0102953 A1 * | 4/2015 | Stayton | G01S 13/785 | 342/47 |
| 2016/0013923 A1 * | 1/2016 | Malaga | H04L 5/14 | 370/277 |
| 2016/0170016 A1 * | 6/2016 | Bilek | G01S 13/74 | 342/29 |

OTHER PUBLICATIONS

S. Roy, "Performance analysis of hierarchical selection diversity combining in Rayleigh fading," 2013 International Conference on Computing, Networking and Communications (ICNC), San Diego, CA, 2013, pp. 983-987.*

A. Yilmaz, F. Yilmaz, M. S. Alouini and O. Kucur, "On the Performance of Transmit Antenna Selection Based on Shadowing Side Information," in IEEE Transactions on Vehicular Technology, vol. 62, No. 1, pp. 454-460, Jan. 2013.*

* cited by examiner

SYSTEMS AND METHODS FOR REMOTE L-BAND SMART ANTENNA DISTANCE MEASURING EQUIPMENT DIVERSITY

CROSS REFERENCE TO RELATED APPLICATIONS

This application is related to and claims the benefit and priority of U.S. Provisional Patent Application No. 61/890,416, filed Oct. 14, 2013, the entirety of which is hereby incorporated herein by reference.

BACKGROUND

Field

Various avionics systems may benefit from the proper handling of diversity with respect to antennas. For example, systems and methods for remote L-band smart antenna distance measuring equipment may benefit from being prepared to provide diversity against interference, such as a multipath interference.

Description of the Related Art

Current L-Band avionic system functions, such as TCAS, Mode S transponders, ATCRBS transponders, ADS-B IN or ADS-B OUT and DME, provide stand-alone or integrated functional architectures where each single functional unit or integrated functions unit also contains the RF function or functions. This architecture requires an RF interface to a single or to multiple coaxial cables that interconnect the RF function to an antenna. For instance, in the case of a single TCAS unit, there are typically four TCAS-to-antenna interconnecting RF coaxial cables for both the top and the bottom directional antennas, or in the case of a bottom omni-antenna installation, there may be a single interconnecting RF cable from the TCAS unit to the bottom omni-antenna.

A smart antenna system can be designed to integrate, include and simplify the RF portions of the design. Such a smart antenna system design, as well as embodiments of the present invention, may employ anything disclosed in (1) U.S. Provisional Patent Application No. 61/560,104, filed on Nov. 15, 2011 and entitled "SYSTEMS AND METHODS FOR PROVIDING REMOTE L-BAND SMART ANTENNAS" and (2) U.S. patent application Ser. No. 13/678,224, filed on Nov. 15, 2012 and entitled "SYSTEMS AND METHODS OF PROVIDING REMOTE L-BAND SMART ANTENNAS," each of which were filed in the name of the present inventor and are incorporated herein in their entirety by reference.

SUMMARY

According to certain embodiments, a method can include determining which antenna of a plurality of antennas of an aircraft is preferred for communication with respect to distance measuring equipment. The method can also include selecting the antenna based on the determination.

In certain embodiments, an apparatus can include at least one processor and at least one memory including computer program instructions. The at least one memory and the computer program instructions can be configured to, with the at least one processor, cause the apparatus at least to determine which antenna of a plurality of antennas of an aircraft is preferred for communication with respect to distance measuring equipment. The at least one memory and the computer program instructions can also be configured to, with the at least one processor, cause the apparatus at least to select the antenna based on the determination.

An apparatus, according to certain embodiments, can include means for determining which antenna of a plurality of antennas of an aircraft is preferred for communication with respect to distance measuring equipment. The apparatus can also include means for selecting the antenna based on the determination.

BRIEF DESCRIPTION OF THE DRAWINGS

For proper understanding of the invention, reference should be made to the accompanying drawings, wherein.

DETAILED DESCRIPTION

The integration of a DME function with the TCAS/Mode S/ADS-B RF functions within a smart antenna may require a higher output power, typically about 400 Watts at the antenna terminals, and therefore it may become difficult to provide enough RF power down a 3 dB (half power) lossy coax to a bottom omni-directional antenna that may be required for DME transmission. This may necessitate the need for an additional smart antenna on the bottom of the aircraft, increasing system cost and weight while also reducing system reliability.

Certain embodiments of the present invention may provide for a DME antenna diversity function that may improve system performance during multipath interference, and create a method for reducing the amount of power on a bottom DME omni-antenna. Thus, in certain embodiments less power may be needed for a bottom DME omni-antenna.

Certain embodiments of the present invention may use a top smart antenna for longer ranges that may require higher power, and may use the top smart antenna or bottom omni-blade antennas at closer ranges where lower power use is acceptable and where multipath angles are more prevalent in creating an interfering multipath problem.

During transmission of aircraft DME interrogations, an optimal reception path can be chosen for one or more replies that also indicates which of two or more antennas to select for the optimal RF link between the interrogation system and the replying system.

As an example, during a DME search mode (defined in RTCA DO-189, MOPS for Airborne DME, which is hereby incorporated by reference in full), several hundred interrogations per second may be sent to establish a link from an aircraft interrogator to the replying ground transponder. These interrogations can be used to establish which antenna to use based on the quality or other parameters of the replies. For instance, the signal strength and/or the signal reply time between antennas can be compared in order to select the optimal link.

Figure 1:
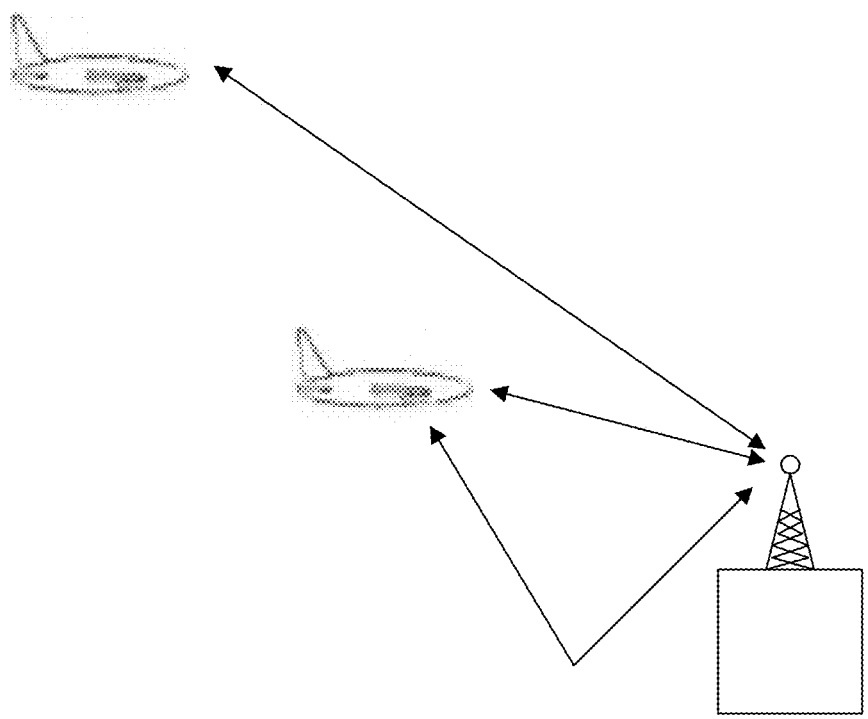
FIG. 1 illustrates antenna selection according to certain embodiments of the present invention.

FIG. 1 illustrates antenna selection according to certain embodiments of the present invention. This DME link diagram illustrates an interrogation path and a reply path of a DME link and the associated multipath that might occur.

FIG. 1 shows top and bottom antenna paths that can be selected using top/bottom antenna diversity on the aircraft. At longer ranges, the top antenna may be selected because it has more interrogation signal strength. Additionally, because the multipath angle is such that the maximum antenna pattern gain is not in-line with the reflected signal from the ground, the multipath signal may be weaker than the direct straight-line signal at longer distances.

At shorter ranges, the antenna pattern gain may be in-line with the reflected signal from the ground, and thus, the reflected signal strength may interfere with either the top or the bottom antenna. The antenna with the least amount of multipath interference due to antenna shielding or due to the phase of the received multipath signal versus the direct path signal may be used.

Certain embodiments of the present invention permit a single smart antenna on top of the aircraft to be used for a DME function in conjunction with a standard ATC bottom omni-directional blade antenna, without the burden of supplying a 3 dB higher (double) amount of RF power through the 3 dB loss of the coax from the smart antenna to the omni-antenna. This approach may thus simplify the power supply and RF amplifier design of the smart antenna, increasing reliability and reducing cost.

Certain embodiments of the present invention also improve DME link reliability from what is possible with conventional DME systems that are more susceptible to multipath interference conditions.

Figure 2:
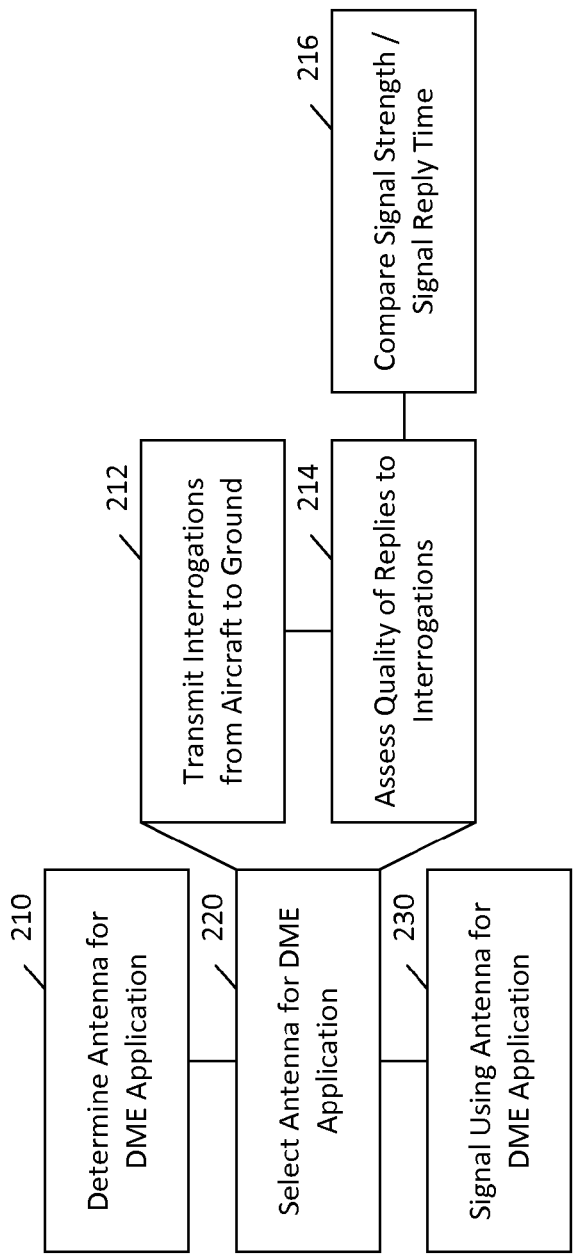
FIG. 2 illustrates a method according to certain embodiments of the present invention.

FIG. 2 illustrates a method according to certain embodiments. As shown in FIG. 2, a method can include, at 210, determining which antenna of a plurality of antennas of an aircraft is preferred for communication with respect to distance measuring equipment. The method can also include, at 220, selecting the antenna based on the determination.

For example, a top antenna of the plurality of antennas can be selected when a range to a distance measurement equipment ground station is greater than a predetermined threshold. Alternatively, in some cases a bottom antenna of the plurality of antennas can be selected when a range to a distance measurement equipment ground station is less than a predetermined threshold. Thus, in certain embodiments determination of which antenna can be made after identifying whether the aircraft is less than a predetermined threshold distance from a distance measurement equipment ground station. In a sense, then, there can be two or more criteria: a distance criterion and then some further criterion, such as a criterion related to multipath interference.

In certain embodiments, the determining can include, at 212, transmitting a plurality of interrogations to establish a link from an aircraft interrogator to a replying ground transponder. The determining can further include, at 214, assessing quality or other parameters of the replies to determine the antenna to be preferred for communication. For example, the determining can include, at 216, comparing signal strength and/or signal reply time between or among antennas in order to select the antenna.

The method can further include, at 230, signaling for a DME application over the determined/selected antenna. This signaling can be performed for the remainder of the DME communications, or the determination/selection at 210 and 220 can be repeatedly performed.

Figure 3:
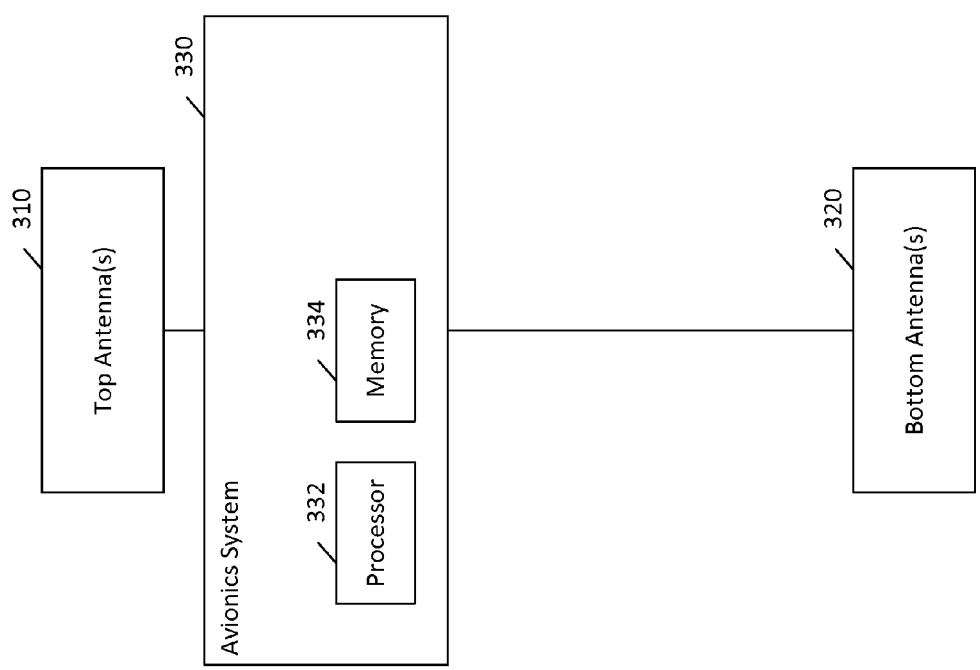
FIG. 3 illustrates a system according to certain embodiments of the present invention.

FIG. 3 illustrates a system according to certain embodiments. As shown in FIG. 3, the system can include one or more top antenna(s) 310 and one or more bottom antenna(s) 320, each connected to an avionics system 330. The top antenna(s) 310 may include a smart antenna. The bottom antenna(s) 320 may include an omni-directional antenna. Although not shown to scale, the bottom antenna(s) 320 may be at a greater cabling distance from avionics system 330 than the top antenna(s) 310 are. Additional antennas can also be included in other places, with these positions being shown for purposes of illustration.

The avionics system 330 can include at least one processor 332 and at least one memory 334, which can include computer program instructions for performing the method illustrated in FIG. 2. Thus, in certain embodiments the avionics system 330, including the at least one processor 332 and at least one memory 334 can provide the means for carrying out the blocks of FIG. 2.

The at least one processor 332 of FIG. 3 may be any computational device, such as a central processing unit (CPU), controller, microprocessor, or application specific integrated circuit (ASIC). Likewise, the at least one memory 334 can be any computer storage medium, such as a non-transitory computer readable medium. The memory 334 may be a random access memory (RAM), a read-only memory (ROM), or other storage element. The memory 334 and the processor 332 may, but are not required to, be co-located on a same computer chip, or on a same printed circuit board. Other embodiments are also permitted.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL LIST OF ABBREVIATIONS

TCAS traffic collision avoidance system or traffic alert and collision avoidance system
ATCRBS air traffic control radar beacon system
ADS-B automatic dependent surveillance-broadcast
DME distance measuring equipment
RF radio frequency
RTCA Radio Technical Commission for Aeronautics

I claim:
1. A method, comprising:
determining, by a processor, which antenna of a plurality of antennas of an aircraft is preferred for communication with respect to distance measuring equipment, wherein a criterion of the determination is which antenna is expected quality of communication with the distance measuring equipment; and
selecting, by the processor, the antenna for communication with the distance measuring equipment based on the determination.
2. The method of claim 1, wherein a top antenna of the plurality of antennas is selected when a range to a distance measurement equipment ground station is greater than a predetermined threshold.
3. The method of claim 1, wherein a bottom antenna of the plurality of antennas is selected when a range to a distance measurement equipment ground station is less than a predetermined threshold.
4. The method of claim 1, wherein the determination is performed after identifying whether the aircraft is less than a predetermined threshold distance from a distance measurement equipment ground station.
5. The method of claim 1, wherein the determining comprises transmitting a plurality of interrogations to establish a link from an aircraft interrogator to a replying ground transponder; and assessing quality of the replies to determine the antenna to be preferred for communication.

6. The method of claim 1, wherein the determining comprises comparing signal strength and/or signal reply time between or among antennas in order to select the antenna.

7. An apparatus, comprising:

at least one processor; and at least one memory including computer program instructions, wherein the at least one memory and the computer program instructions are configured to, with the at least one processor, cause the apparatus at least to determine which antenna of a plurality of antennas of an aircraft is preferred for communication with respect to distance measuring equipment, wherein a criterion of the determination is which antenna is expected quality of communication with the distance measuring equipment; and select the antenna for communication with the distance measuring equipment based on the determination.

8. The apparatus of claim 7, wherein the at least one memory and the computer program instructions are configured to, with the at least one processor, cause the apparatus at least to select a top antenna of the plurality of antennas when a range to a distance measurement equipment ground station is greater than a predetermined threshold.

9. The apparatus of claim 7, wherein the at least one memory and the computer program instructions are configured to, with the at least one processor, cause the apparatus at least to select a bottom antenna of the plurality of antennas when a range to a distance measurement equipment ground station is less than a predetermined threshold.

10. The apparatus of claim 7, wherein the at least one memory and the computer program instructions are configured to, with the at least one processor, cause the apparatus at least to perform the determination after identifying whether the aircraft is less than a predetermined threshold distance from a distance measurement equipment ground station.

11. The apparatus of claim 7, wherein the determination comprises transmitting a plurality of interrogations to establish a link from an aircraft interrogator to a replying ground transponder; and assessing quality of the replies to determine the antenna to be preferred for communication.

12. The apparatus of claim 7, wherein the determination comprises comparing signal strength and/or signal reply time between or among antennas in order to select the antenna.

13. An apparatus, comprising:

means for determining which antenna of a plurality of antennas of an aircraft is preferred for communication with respect to distance measuring equipment, wherein a criterion of the determination is which antenna is expected quality of communication with the distance measuring equipment; and means for selecting the antenna for communication with the distance measuring equipment based on the determination.

14. The apparatus of claim 13, wherein a top antenna of the plurality of antennas is selected when a range to a distance measurement equipment ground station is greater than a predetermined threshold.

15. The apparatus of claim 13, wherein a bottom antenna of the plurality of antennas is selected when a range to a distance measurement equipment ground station is less than a predetermined threshold.

16. The apparatus of claim 13, wherein the determination is performed after identifying whether the aircraft is less than a predetermined threshold distance from a distance measurement equipment ground station.

17. The apparatus of claim 13, wherein the means for determining comprises means for transmitting a plurality of interrogations to establish a link from an aircraft interrogator to a replying ground transponder; and means for assessing quality of the replies to determine the antenna to be preferred for communication.

18. The apparatus of claim 13, wherein the means for determining comprises means for comparing signal strength and/or signal reply time between or among antennas in order to select the antenna.

* * * * *